(12) United States Patent
Stone

(10) Patent No.: X8434
(45) Date of Patent: Oct. 6, 1834

(54) SAW MILL STRAP

(76) Inventor: Othniel Stone

Othniel Stone
Letters Patent

The schedule referred to in these Letters Patent and mak-
ing part of the same containing a description in the words of
the said Othniel Stone himself, of his improvement in
saw mills & sawing machines called the Strap saw.
To all persons to whom these presents shall come
Othniel Stone of the town of Pittsford in the county of
Monroe and State of New York send greeting.
Be it known that I the said Othniel Stone have invented
constructed and applied to use new and usefull improve-
ments in saw mills and sawing machines called by me
the Strap saw & are specified together with the saw in the
words following. The saw containing said improvement is
made in the form of a hoop or ring, and may be made
any number of feet in circumference according to the
purposes to which it is to be applied. and the saw-
plate may be of any width or thickness. The size of the
saw selected for description herein is nine feet in cir-
cumference. three inches in width and the thickness of
a thin wood saw: but the circumference of the saw. the
width and thickness vary according to circumstances
The saw is hung round two wheels or drums eighteen in
ches in diameter and three inches thick with a rim
one fourth of an inch raised above the wheel or drum
for the back of the saw, to run against: to prevent the saw
from running off the wheels or drums which wheels or
drums are to be placed the one directly over the other
but the wheels or drums may be any other diameter or thick-
ness or the rim raised less or more than one fourth of an inch
as may be most convenient. The above description applies
to a saw with teeth on one edge only. The saw may be
made made with teeth on both edges so as to saw both ways in
which case the wheels or drums will be made with cogs in
the centre of the wheels or drums two inches apart and one fourth
of an inch square at the surface and tapering towards the outer
ends with square holes in the saw two inches apart and
one fourth of an inch square to keep the saw when in mo-
tion from slipping either way on the wheels or drums but
the cogs may be put any distance apart and any size pro-
vided they secure the saw when in motion from slipping on
the wheels or drums. and the wheels or drums may be
any thickness. but if they are thicker than the width of the
saw. it will be necessary that the part of the wheels or
drums directly inside of the teeth of the saw be made less
than the rest part of the wheels or drums so as to prevent
the same from taking the set out of the saw. The wheels may
be made of wood or iron or any kind of metals or part
wood and part iron or metal. If the wheels or drums
be made of iron or any kind of metal the same may be
covered with leather so that the outer edge or edges may
be pared or cut down as the saw grows narrower by use.
The saw is to be kept steady by means of two pairs of rollers
the lower pair stationary, and the upper pair moveable. the
lower pair of rollers will be placed directly under and as
near as may be to the timber or wood to be sawed. and the
upper roller will be placed directly over the timber or wood to
be sawed with a slide to raise it up or down as the thick-
ness of the timber or wood to be sawed may require which rol-
lers may be made of wood or iron or part wood & part iron
& to be as long as the saw is wide and the rollers of each
pair to be far enough apart to let the saw pass between
them and made a little smaller where the saw teeth are
so as not to take the set out; which rollers may be an
inch or more in diameter. If it should be necessary one or more set of rollers may be stationed to keep the saw steady
& from trembling. The saw may be driven by the applic-
ation of hand, horse, steam, or water power and applied
to the sawing of mill logs of any dimensions. slitting, saw-
ing veneering, sawing wood, or any kind of sawing whatever.
When the saw is stretched upon the wheels or drums the
sides will be flattened. The specific new and useful
improvements herein before described and claimed by me as
the inventor are the following. First the shape of the saw.
Second the manner of hanging the saw. Third the man-
ner of keeping the saw steady when in motion by means
of rollers. Fourth the manner of making the saw with
teeth on one or both edges Othniel Stone Witnesses
Ira Bellows
Solomon Stone Drawn Exd.
W.G.

[illegible]